Figure 4:
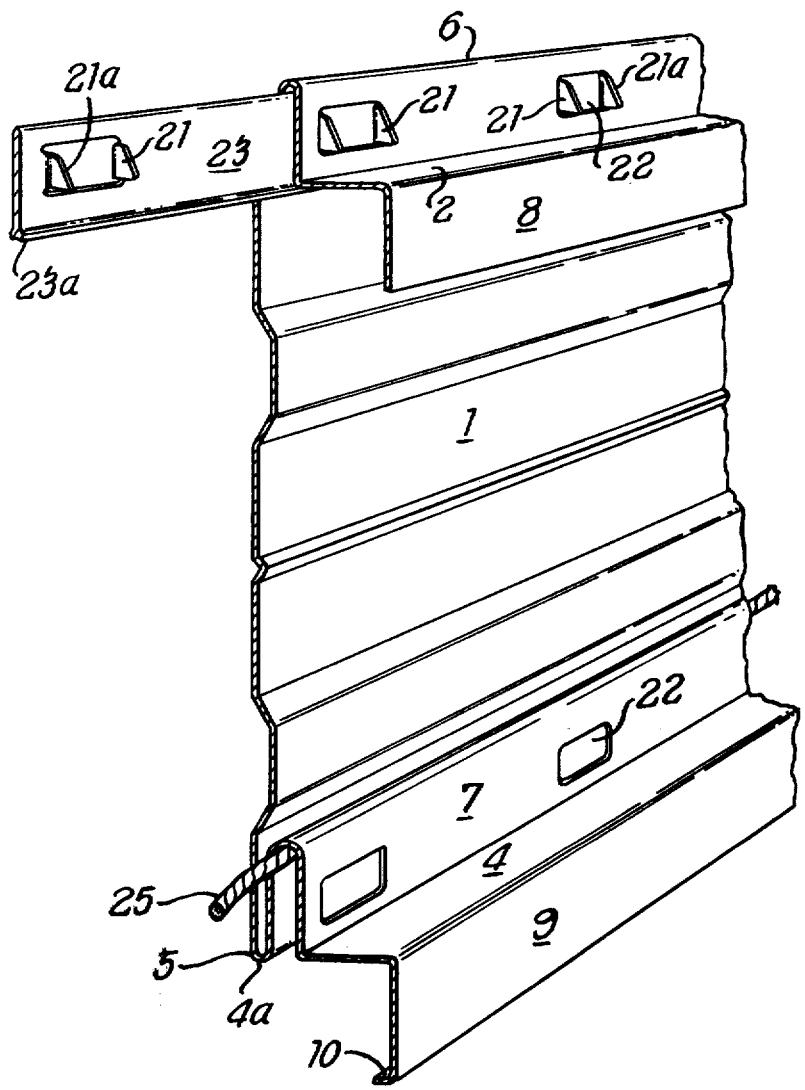

United States Patent [19]

Kyne

[11] 3,969,866
[45] July 20, 1976

[54] SHEET ASSEMBLIES AND SHEETS THEREFOR

[75] Inventor: Peter John Kyne, Hemel Hempstead, England

[73] Assignee: P.J.K. Projects Limited, Hemel Hempstead, England

[22] Filed: Apr. 11, 1974

[21] Appl. No.: 459,927

[30] Foreign Application Priority Data
Apr. 16, 1973 United Kingdom............. 18223/73
July 25, 1973 United Kingdom............. 35344/73

[52] U.S. Cl................................. 52/588; 52/522; 52/539
[51] Int. Cl.$^2$......................................... E04C 1/10
[58] Field of Search ............. 52/588, 529, 526, 522, 52/527, 543, 544, 753 J, 753 D, 530, 531, 532, 542, 520, 539, 478, 579, 758 D

[56] References Cited
UNITED STATES PATENTS

| | | | |
|---|---|---|---|
| 2,642,968 | 6/1953 | Roush et al............................ | 52/522 |
| 3,064,770 | 11/1962 | Andrews................................ | 52/588 |
| 3,127,962 | 4/1964 | James................................... | 52/522 X |
| 3,324,617 | 6/1967 | Knight et al......................... | 52/588 X |
| 3,394,524 | 7/1968 | Howarth............................... | 52/758 D X |
| 3,399,916 | 9/1968 | Ensor................................... | 52/758 D |
| 3,719,986 | 3/1973 | Ardnolino et al................... | 52/758 D |
| 3,733,767 | 5/1973 | Crack................................... | 52/588 X |

FOREIGN PATENTS OR APPLICATIONS
284,855  10/1966  Australia............................. 52/588

Primary Examiner—Ernest R. Purser
Assistant Examiner—Carl D. Friedman
Attorney, Agent, or Firm—Johnson, Dienner, Emrich & Wagner

[57] ABSTRACT

The invention disclosed relates to fabricated rigid sheets profiled for engagement with adjacent similar sheets for assembly as a panel having sufficient rigidity to enable sufficiently large areas to be produced for the construction of van bodies, domestic and other building, caravans and road signs. Each sheet is of substantially rectangular shape with rearwardly extending flanges at each of the opposed longitudinal edges arranged supportingly to engage a corresponding flange of an adjacent similar sheet in assembly. One of the flanges is formed with at least one and preferably a plurality of spaced openings and securing means is associated with the other of the flanges for engagement in the openings of an adjacent similar sheet. Preferably the flanges connect to their respective longitudinal edges by folds one of which is formed with spaced apertures and the other of which is dimensioned to be received in the one fold of an adjacent similar sheet and has projections associated therewith for engagement in the apertures of the adjacent similar sheet. The projections may be stuck out of the rear wall of the inner fold or may be formed on a securing strip dimensioned to be received in the inner fold in which case the projections extend through apertures in the rear wall of the inner fold.

8 Claims, 12 Drawing Figures

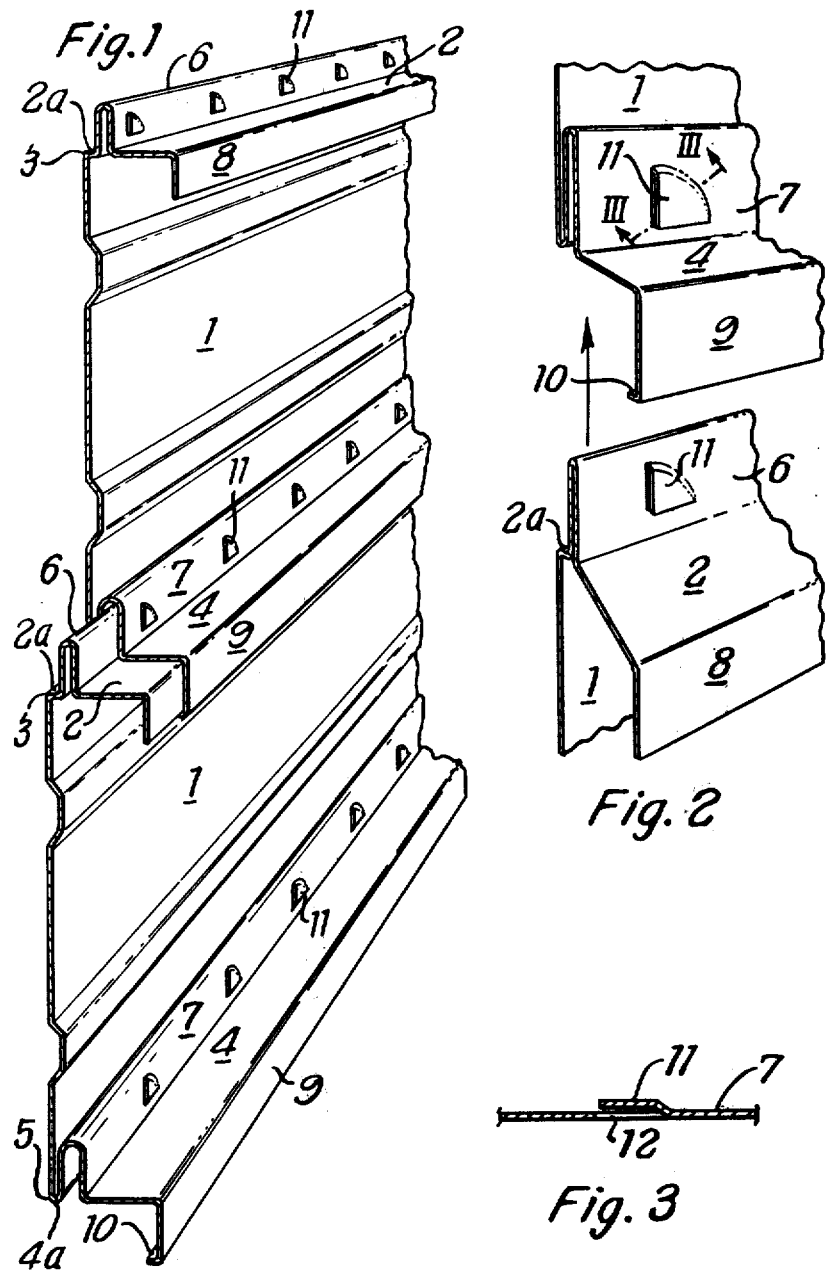

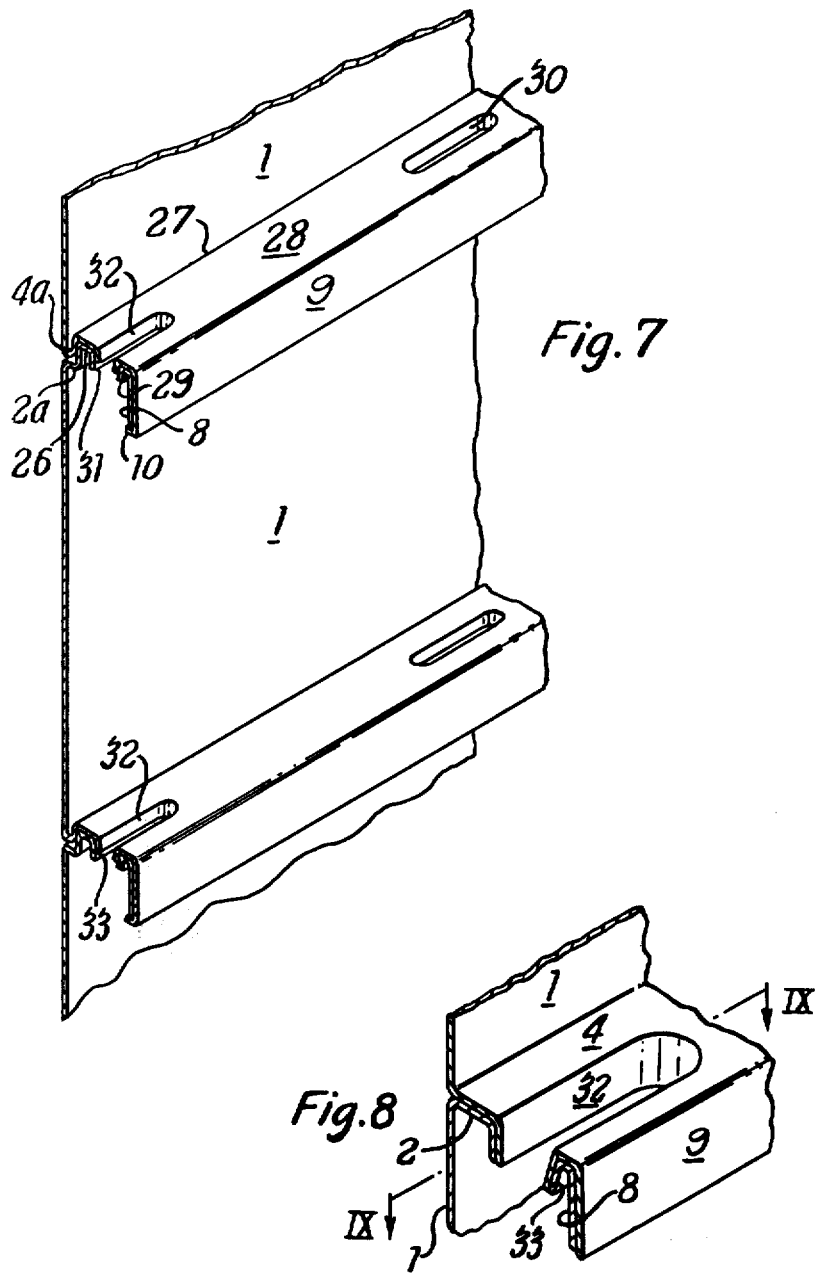

SHEET ASSEMBLIES AND SHEETS THEREFOR

BACKGROUND OF THE INVENTION

This invention relates to sheet assemblies and sheets therefor.

In the construction of large substantially rigid panels it is frequently desirable to produce large areas with a minimum of bracing elements. Such panels can be made of any suitable material although metals such as aluminum or steel or their alloys are preferred. Such large panels find application, for example, in the construction of van bodies, domestic buildings, caravans and road signs. It is desirable that such large panels should be capable of ready assembly from smaller sheets which can be easily and economically connected together to provide a panel of the desired size and rigidity.

BRIEF SUMMARY OF INVENTION

The invention broadly stated provides a fabricated rigid sheet profiled for engagement with an adjacent similar sheet for assembly as a panel, the sheet being of substantially rectangular shape and having a first flange extending rearwardly of one longitudinal edge and a second flange extending rearwardly of a longitudinal edge opposed to said one longitudinal edge, at least one opening in one of the first and second flanges and securing means associated with the other of said first and second flanges for engagement at said opening of the adjacent similar sheet with the first flange of one sheet in supporting engagement with the second flange of the adjacent similar sheet.

According to one aspect of the present invention, there is provided a fabricated rigid sheet profiled for engagement with an adjacent similar sheet for assembly as a panel, the sheet being of substantially rectangular shape and having a first flange extending rearwardly of one longitudinal edge to which it is connected by a first fold providing a first U-shaped channel and a second flange extending rearwardly of a second longitudinal edge opposed to said one longitudinal edge, the second flange being connected to the second longitudinal edge by a second fold providing a second U-shaped channel, the first and second channels being rearward of the general plane of the sheet and opening in the same direction and being so dimensioned that the first fold is engageable within the second fold of an adjacent similar sheet to locate the adjacent sheets with the first flange in supporting engagement with the second flange of the adjacent similar sheet, at least one opening in the wall of one of the first and second folds and securing means associated with the other of said first and second folds for engagement in said opening of the adjacent similar sheet.

The opening or openings can be formed in the wall of the first fold with the securing means formed as projections extending inwardly of the second fold of the adjacent sheet and into the opening or openings in the first fold. Such projections may be struck out from the material of the second fold and inwardly thereof. Such projections may be formed in situ when the adjacent sheets are engaged or may be preformed.

It is preferred, however, that the securing means be in the form of projections extending outwardly from the first fold for engagement with an aperture or apertures in the wall of the second fold of the adjacent similar sheet.

According to a preferred embodiment of the invention, the rear wall of the first fold is formed with a plurality of spaced apertures along the length of the fold, the rear wall of the second fold is formed with a plurality of correspondingly spaced apertures along the length thereof so that the apertures in the second fold register with the apertures of the first fold of an adjacent similar sheet and the securing means comprises a separate strip dimensioned to be received within the first fold and formed with projections spaced at intervals to correspond with the spacing between the apertures in the first and second folds and arranged to extend through the apertures of the first fold into the apertures of the second fold of an adjacent engaged similar sheet.

The invention also extends to a plurality of sheets according to any one of the preceding four paragraphs with the first fold of one sheet engaged within the second fold of an adjacent similar sheet and the securing means engaged in the opening.

According to another aspect of the present invention there is provided a panel composed of a plurality of adjacent similar fabricated rigid sheets each being of substantially rectangular shape and formed with a first flange extending rearwardly of one longitudinal edge to which it is connected by a first fold providing a first U-shaped channel and a second flange extending rearwardly of a second longitudinal edge opposed to said one longitudinal edge, the second flange being connected to the second longitudinal edge by a second fold providing a second U-shaped channel, the first and second channels being rearward of the general plane of the sheet and opening in the same direction, the first fold of one sheet being engaged within the second fold of the adjacent similar sheet with the first flange of the one sheet in supporting engagement with the second flange of the adjacent similar sheet, openings in the wall of one of the first and second folds and securing means associated with the other of the first and second folds and engaged in said openings.

Preferably, the openings are formed in the rear walls of both the first and second folds and are in register and the securing means comprises a securing strip received within the first fold and formed with projections engaged in the apertures of the engaged first and second folds of adjacent similar sheet.

Figure 5:
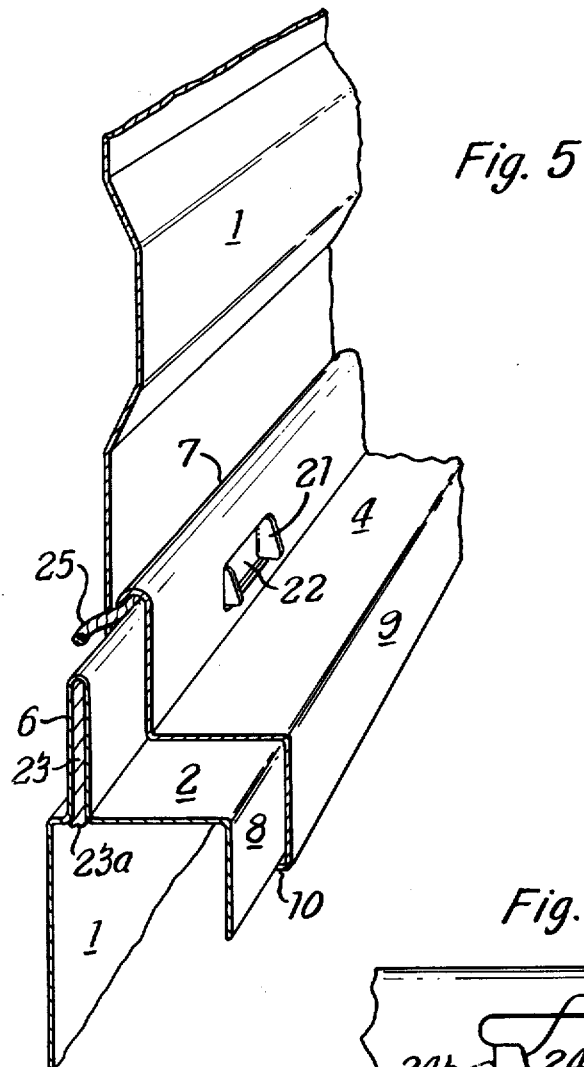
Figure 6:
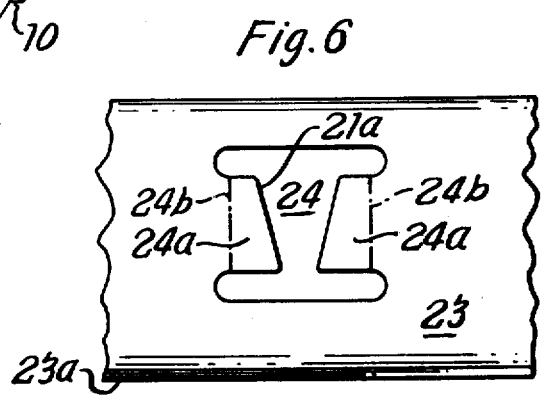
Figure 9:
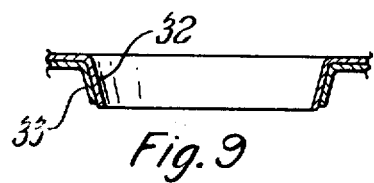

Embodiments of the invention will now be described by way of example, reference being made to the accompanying drawings in which:

FIG. 1 is a fragmentary perspective view showing two sheets according to the invention engaged to form a panel, FIG. 2 is a fragmentary enlarged view showing the two sheets of FIG. 1 ready for engagement to form a panel, FIG. 3 is a section taken on the line III—III of FIG. 2, FIG. 4 is a fragmentary perspective view of a preferred form of sheet according to the invention with associated securing means, FIG. 5 is a fragmentary perspective view showing two sheets according to FIG. 1 secured together, and FIG. 6 is a fragmentary elevational view of the securing means shown in FIGS. 4 and 5, FIG. 7 is a view similar to FIG. 1 illustrating a modified sheet, FIG. 8 is an enlarged fragmentary view illustrating a modification, FIG. 9 is a view taken on the line IX—IX of FIG. 8, and FIGS. 10, 11 and 12 are views similar to FIG. 8 illustrating further modifications.

In the example illustrated in FIGS. 1 to 3 a panel is formed from a plurality of fabricated rigid sheets 1 of which two adjacent similar sheets are illustrated. The sheets 1 are profiled for engagement with adjacent similar sheets and whilst they can be formed in any suitable material of sufficient rigidity in the profiled condition they are preferably made of metal such as aluminum or steel or their alloys. In this example, the sheets are roll-formed of an aluminum alloy identified as NS3-H4 and are 1 mm. thick.

Each sheet 1 is formed with a first rearwardly extending flange 2 along one longitudinal edge 3 which is the upper edge as seen in FIG. 1 and a second rearwardly extending flange 4 along the lower opposed longitudinal edge 5. The upper flange 2 is connected to the associated longitudinal edge by a first fold 6 and the lower flange 4 is connected to the lower longitudinal edge by a second fold, both folds being of substantially U-shape and being dimensioned so that the first fold 6 is engageable within the second fold 7 when the flanges 2 and 4 of adjacent similar sheets are in supporting engagement. Both folds 6 and 7 are disposed rearwardly of the general plane of the sheet and open in the same direction, the fold 6 being connected to the upper longitudinal edge 3 by a continuation 2a of the flange 2 to provide a supporting ledge for the next adjacent sheet, the fold 7 being connected to the lower longitudinal edge 5 by a similar continuation 4a of the flange 4. The flange 3 extends rearwardly of the general plane of the sheet 1 by a distance less than does the flange 4 and is formed with a downwardly depending flange 8 which is of lesser width than a corresponding downwardly depending flange 9 formed on the flange 4. The flange 9 has an inturned lip 10 of a width sufficient to engage under the free edge of the flange 8 of an adjacent similar sheet.

Securing means is provided by displacing a sector shaped piece of metal rearwardly of the rear walls of the folds 6 and 7, this being done at regular intervals to provide projections 11 which leave sector shaped apertures 12 which are in register when adjacent sheets are assembled. As seen in FIG. 1 the first fold 6 extends above and beyond the longitudinal edge 3 whereas the second fold 7 extends behind the sheet. In assembling a plurality of sheets 1 to form a panel, the closed end of the fold 6 of one sheet is presented to the open end of the fold 7 of the adjacent sheet. As the depth of the fold 6 is advantageously slightly less, e.g., 1 mm., than the width of the flange 9, the lip 10 of the upper sheet will abut against the flange 2 of the lower sheet. The inherent resilience of the sheet material is sufficient to enable the flange 9 to be bowed outwardly to enable the free edge of the lip 10 to clear the rear edge of the flange 2 and enable the fold 6 to be engaged within the fold 7 to an extent sufficient to bring the flanges 2 and 4 and the continuations 2a and 4a into supporting engagement. To facilitate the outward bowing of the flange 4, the continuation 4a is preferably curved or radiused as shown. When the flanges 2 and 4 are in supporting engagement, the lip 10 extends underneath the free edge of the flange 8 of the adjacent sheet.

When inserting the fold 6 into the fold 7 with the projections 11 and apertures 12 in register the projections 11 in the rear wall of the fold 6 tend to be displaced inwardly by the rear wall of the fold 7 until they reach an aperture 12 in the latter when they return to their normal position and engage in an aperture 12 in the fold 7.

When assembled, it can be seen that displacement of a fold 6 out of a fold 7 in an adjacent sheet is opposed by the lip 10 and by the weight of the sheets. Relative longitudinal sliding movement of adjacent sheets 1 is opposed by engagement of the projections 11 in the fold 6 with the apertures 12 in the fold 7 of the adjacent sheet. Relative angular displacement of adjacent sheets is prevented by engagement of the walls of the folds 6 and 7, the flanges 2 and 4, the continuations 2a and 4a and the lip 10.

Thus the sheets 1 enable a panel of relatively large area to be readily assembled from individual sheets and to a significant degree of rigidity. This is of particular importance in the construction of van bodies and containers for freight and for walls of buildings.

The sheets 1, as illustrated, are conveniently formed with corrugations and may be roll-formed to any desired length. It may be convenient, in assembling the sheets to assemble them in staggered relationship.

It will be appreciated that, in the arrangement shown, the projections 11 in the folds 6 of adjacent sheets may be deformed inwardly to displace them from the aperture 12 in which they are engaged, e.g., by a hammer blow, thereby making it possible for a sheet in a panel assembly to be removed by sliding it longitudinally relative to adjacent sheets.

The example illustrated in FIGS. 4, 5 and 6 is similar to that described with reference to FIGS. 1 to 3 and like reference numerals are used to denote like parts. In this example, the rear wall of the fold 6 and the rear wall of the fold 7 are formed with spaced apertures 22 of substantially rectangular shape the projections 11 of the previous example being omitted. The projections are formed on a separate strip 23 as projections 21, the strip 23 being dimensioned to be received in the fold 6. As can be seen from FIG. 6, the securing means in this example is provided by the strip 23 formed with apertures 24 at a spacing corresponding to that of the spaced apertures 22. These apertures 24 are substantially of I-shape to leave two wings 24a which when bent out of the general plane of the strip 23 along foldlines 24b provide the projections 21 which are of trapesium shape, the upper free edge being slightly longer than twice the thickness of the metal sheet 1 and less than the lower free edge and the outer free edge 21a being inclined to provide a camming action.

In assembling two sheets according to this example, the fold 6 is inserted into the fold 7 of the adjacent similar sheet as before and it is preferred to provide a sealing cord 25 in the base of the fold 7. With the apertures 22 in the folds 6 and 7 in register, the strip 23 is inserted into the fold 6, the projections 21 effecting a camming action until they engage in the registering apertures 22 in the folds 6 and 7. As an alternative, the strip 23 may be inserted into the fold 6 before the fold 6 is inserted into the fold 7 of the adjacent sheet.

As will be seen at 23a, it is preferred that the lower edge of the strip 23 be thickened slightly as compared with the general thickness of the strip.

In the modified sheet illustrated in FIG. 7 the folds 6 and 7 of the previous examples are enlarged so that their bases or closed ends occupy the whole width of the flanges 2 and 4 of the previous examples. These enlarged folds are identified in FIG. 7 as 26 and 27 and their bases as 28 and 29. These bases 28 and 29 are deformed at spaced intervals along their length to provide slots 30 and 31 with depending walls 32 and 33 which register and engage with each other when adjacent panels are assembled. These slots 30 and 31 with their depending walls 32 and 33 can be regarded as interrupted subfolds in the main folds 26 and 27.

In the modification illustrated in FIGS. 8 and 9 the folds 26 and 27 are omitted, the flanges 2 and 4 of the examples illustrated in FIGS. 1 to 6 being retained with the interrupted sub-folds of the example illustrated in FIG. 7 being retained.

Figure 10:
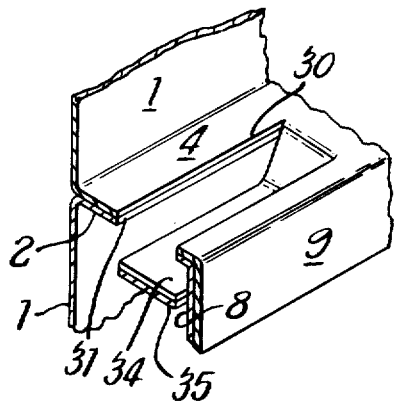

FIG. 10 illustrates a modification of the arrangement illustrated in FIGS. 8 and 9. In this case, the sub-folds are provided by slots 30 and 31 but the opposed longitudinal side-walls 32 and 33 of these slots are omitted but the base of the slots is retained as at 34 and 35. It will be appreciated that in the examples illustrated in FIGS. 8, 9 and 10, the walls 32 and 33 of the slots or the bases 34 and 35 of the slots are obtained by deformation out of the flanges 4 and 2.

Figure 11:
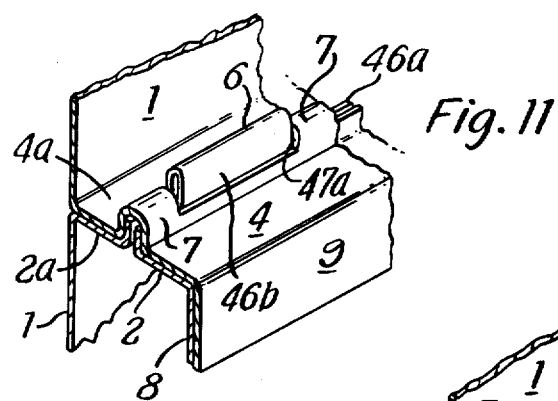

The modification illustrated in FIG. 11 is similar to the embodiments described with reference to FIGS. 1 to 6 in that the folds 6 and 7 are retained. In this case the fold 6 has a greater depth than the fold 7 but is cut away at intervals along its length as at 46a to leave projections 46b which extend through apertures 47a provided by cutting the fold 7 away at corresponding intervals.

Figure 12:
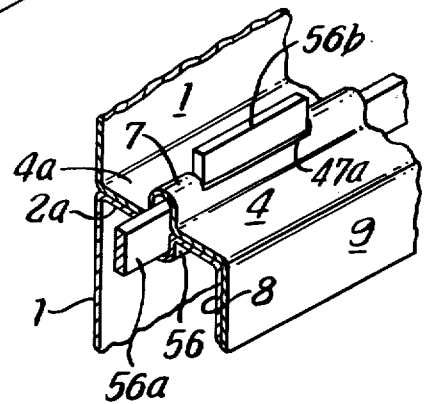

The modification illustrated in FIG. 12 is similar in many respects to that described with reference to FIG. 11 but in this case the fold 6 is inverted as shown at 56 and is substantially the same dimension as the fold 7 which is cut away as in the previous example to provide spaced apertures 47a. The folds 56 and 7 face each other and locate a keying strip 56a formed at intervals with projections 56b which extend through the apertures 47a.

It will be appreciated that a sheet according to the present invention can be economically manufactured and can readily be assembled to provide rigid panels of large area and that, if necessary, individual sheets in an assembled panel can be replaced.

What is claimed is:

1. A fabricated rigid sheet profiled for engagement with an adjacent similar sheet for assembly as a panel, the sheet being of substantially rectangular shape and having a first flange extending rearwardly of one longitudinal edge, a first fold connecting said first flange to said one longitudinal edge and providing a first U-shaped channel, a second flange of greater width than said first flange and extending rearwardly of a second longitudinal edge opposed to said one longitudinal edge, a second fold connecting said second flange to said second longitudinal edge and providing a second U-shaped channel, a third flange extending in one direction from the rear longitudinal edge of said first flange and substantially parallel to the general plane of the sheet, a fourth flange extending in said one direction from the rear longitudinal edge of said second flange and substantially parallel to the general plane of the sheet, said first and second folds extending from the respective first and second flanges in the direction opposite to said one direction, and being rearward of the general plane of the sheet with the first and second channels opening in said one direction and being so dimensioned that the first fold is engageable within the second fold of an adjacent similar sheet by relative displacement of the sheets in the general plane thereof to locate the adjacent sheets with the first flange against and in supporting engagement with the second flange of the adjacent similar sheet, a first plurality of spaced openings in the wall of said second fold remote from the general plane of the sheet, a second plurality of spaced openings in the wall of said first fold remote from the general plane of the sheet located to register with said openings in the second fold of an adjacent similar sheet, a strip dimensioned to be received within said first fold and a plurality of projections integrally formed with said strip and dimensioned to extend into the registering openings formed in the first and second folds of adjacent similar sheets.

2. A sheet according to claim 1 in which the projections have a leading edge of lesser dimension than the trailing edge to provide a camming action when inserted into the first fold.

3. A sheet according to claim 2 in which the projections are formed by wings bent out of the general plane of the strip and arranged in pairs, each pair of wings being dimensioned to extend into corresponding registering openings formed in the first and second folds of adjacent similar sheets.

4. A sheet according to claim 1 in which the third flange has a width less than the width of the fourth flange and the fourth flange is formed with an inturned lip dimensioned to restrain displacement of the third flange when the first fold is engaged in the second fold of an adjacent similar sheet.

5. A sheet according to claim 1 in which the first fold extends beyond the one longitudinal edge and the second fold is disposed rearward of the body of the sheet.

6. A sheet according to claim 1 in which the first fold is connected to the one longitudinal edge by an extension of the first flange and the second fold is connected to the second longitudinal edge by an extension of the second flange, the extensions of the first and second flanges providing supporting ledges.

7. A panel composed of a plurality of sheets according to claim 1.

8. A panel according to claim 7 having a sealing cord disposed between the engaged first and second folds of adjacent similar sheets.

* * * * *